United States Patent [19]

Estes

[11] 4,358,654

[45] Nov. 9, 1982

[54] STATIC POWER SWITCHING SYSTEM FOR INDUCTION HEATING

[76] Inventor: Nelson N. Estes, 4605 Edgemont Dr., Austin, Tex. 78731

[21] Appl. No.: 115,190

[22] Filed: Jan. 25, 1980

[51] Int. Cl.³ .................. H05B 6/06; H02M 7/537
[52] U.S. Cl. .................. 219/10.77; 219/10.49 R; 363/131; 363/56; 363/97; 323/282
[58] Field of Search .................. 219/10.77, 10.49 R, 219/10.75; 363/80, 96, 97, 124, 131–135, 55, 56; 323/17, 18, 22 T, 24, DIG. 1, 279, 282, 285; 307/252 UA, 253, 239, 240, 248, 249

[56] References Cited

U.S. PATENT DOCUMENTS

| 3,823,297 | 7/1974 | Cunningham | 219/10.77 |
| 4,017,701 | 4/1977 | Mittelmann | 219/10.77 X |
| 4,115,676 | 9/1978 | Higuchi et al. | 219/10.49 R |
| 4,196,469 | 4/1980 | Gurwicz | 363/97 X |
| 4,209,683 | 6/1980 | Kiuchi et al. | 219/10.77 |
| 4,210,792 | 7/1980 | Higuchi et al. | 219/10.77 X |

Primary Examiner—B. A. Reynolds
Assistant Examiner—Philip H. Leung
Attorney, Agent, or Firm—Arnold, White & Durkee

[57] ABSTRACT

A static power switching system utilizes a parallel LC resonant circuit which is energized from a unilateral electrical power source through a switch circuit beginning at the point of minimum voltage across the switch circuit. Current drive to the resonant circuit at the point of minimum voltage across the switching element is obtained by controlled switching of a power transistor switch circuit using a switch control circuit that detects the minimum point of a voltage swing across the switch circuit and generates a switch control signal pulse. The switch control signal pulse is adjustable in duration depending upon load requirements and is applied as base drive to the power transistor. Power take off is by coupling to the inductor of the resonant circuit through its magnetic field. The switching system is particularly adapted for use in induction heating apparatus.

9 Claims, 7 Drawing Figures

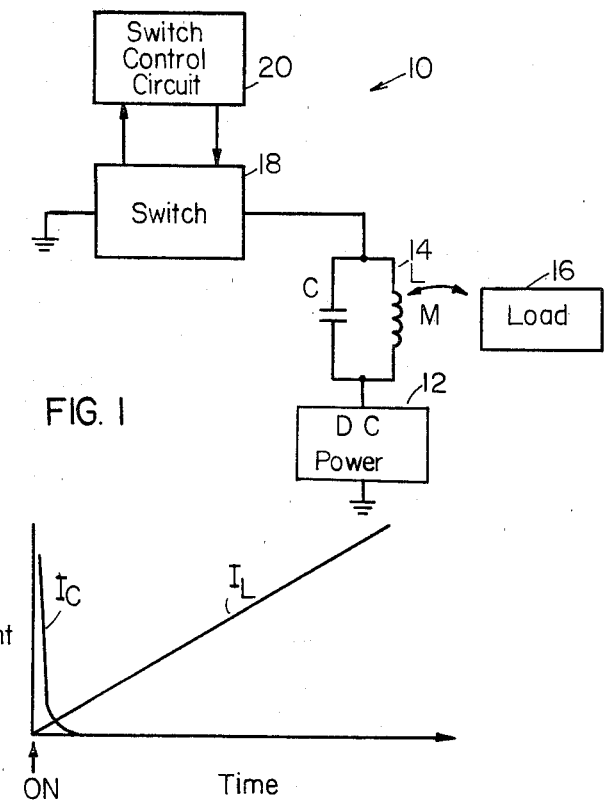
FIG. 1
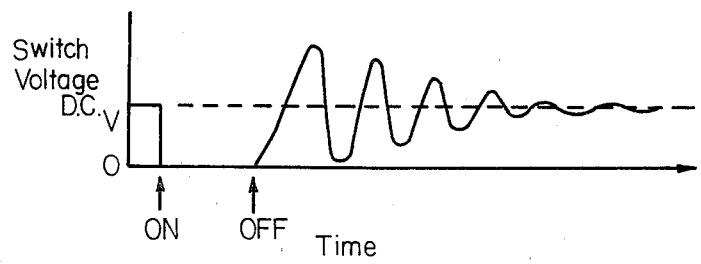
FIG. 2
FIG. 3

STATIC POWER SWITCHING SYSTEM FOR INDUCTION HEATING

BACKGROUND OF THE INVENTION

The present invention relates to static power switching systems, and more specifically to static power inverters which utilize a parallel resonant LC circuit and have load coupling to the inductor through its magnetic field for power take off. Furthermore, the present invention relates to a novel method of driving the resonant circuit of a static power switching system to enhance the efficiency of energy transfer to the load, particularly in such inductive switching applications as induction heating and cooking.

Static power switching systems include both inverters and converters. An inverter circuit is used to convert a dc input to an ac output. Subsequent rectification of the inverter ac output results in dc-to-dc conversion, or a converter circuit. In each type of switching system, a controlled switching element for the dc supply is required. Present day switching systems, particularly inverters, utilize semiconductor devices, for example, silicon controlled rectifier (SCR) and power transistor, for the switching element.

Although parallel resonant circuit static inverters providing a sinusoidal output are known, they are less favored than a series circuit static inverter. Particularly for resistive loads, series circuit inverters have heretofore been predominantly utilized because a series inverter is self commutating and current limited by the series capacitor.

Static power inverters have found application in induction heating equipment wherein an electrically conductive material is subjected to a varying magnetic field which produces an eddy current loss and a hysteresis loss therein so that the temperature of the material increases. While induction heating is found in many industrial uses, it is also finding increasing usage in kitchen ranges for cooking food.

SUMMARY OF THE INVENTION

In accordance with the present invention, a static power switching system is provided in which a parallel resonant LC circuit or network is driven from a unidirectional power source through a power switching element controlled such that drive to the resonant circuit begins at the point of minimum voltage across the switching element. To so drive the resonant circuit, the power switching element is gated by a switch control signal produced in response to the detection of the minimum point of a voltage swing across the switching element. Power take-off from the static power switching system is through the inductor of the LC resonant circuit either by electrical connection of a load across the inductor or by mutual coupling of a load to the inductor through its magnetic field.

Suitably, a static power switching system in accordance with the present invention may utilize a power transistor as the power switching element for applying drive current to the parallel LC resonant circuit. Furthermore, the LC circuit can be driven by a power transistor in either single-ended operation or push-pull. Control of the power transistor(s) for proper switching is by a switch control circuit providing a transistor base drive signal in response to the voltage drop across the transistor or across a switch circuit which includes the transistor.

In operation of a static power switching system in which the power switching element provides current drive to the parallel LC resonant circuit beginning at the point of minimum voltage across the switching element, there results a reduction in losses because power is stored in the inductor at the most efficient point. That is, when the voltage across the switching element is at zero or the minimum voltage level, the capacitor in the LC network is charged; and thus, upon putting energy into the LC network at this point, there is no current flow to the capacitor, thereby obviating the normally encountered losses developed in charging a capacitor. The only losses are in the winding of the inductor and in the switch when a current pulse from the electrical energy source is being supplied. Without power switching element control in accordance with the present invention, a large surge of current would be required by the capacitor upon switching element closure, which would produce a very large loss in the components of the circuit, including resistive losses in the switching element and capacitor.

Although being suitable for use in a number of applications, the static power switching system of the present invention is particularly suitable for induction heating apparatus.

BRIEF DESCRIPTION OF THE DRAWINGS

A more complete appreciation of the invention and many of the attendant features thereof can be obtained by reference to the following detailed description of a preferred embodiment of the invention taken in connection with the accompanying drawings which illustrate the particular preferred embodiment throughout the several views, and wherein:

FIG. 1 is a block diagram representation of a static power switching system in accordance with the present invention;

FIG. 2 is a graph of current flow over time through the capacitor and the inductor of a parallel resonant circuit network after closure of a series switch connected to a unidirectional voltage source;

FIG. 3 is a graph of the voltage across the switch in the system of FIG. 1 before, during and after closure without resonant circuit drive control in accordance with the present invention, illustrating the characteristic "ringing" of a parallel LC resonant circuit after application of a current pulse thereto;

DESCRIPTION OF A PREFERRED EMBODIMENT

Figure 4:
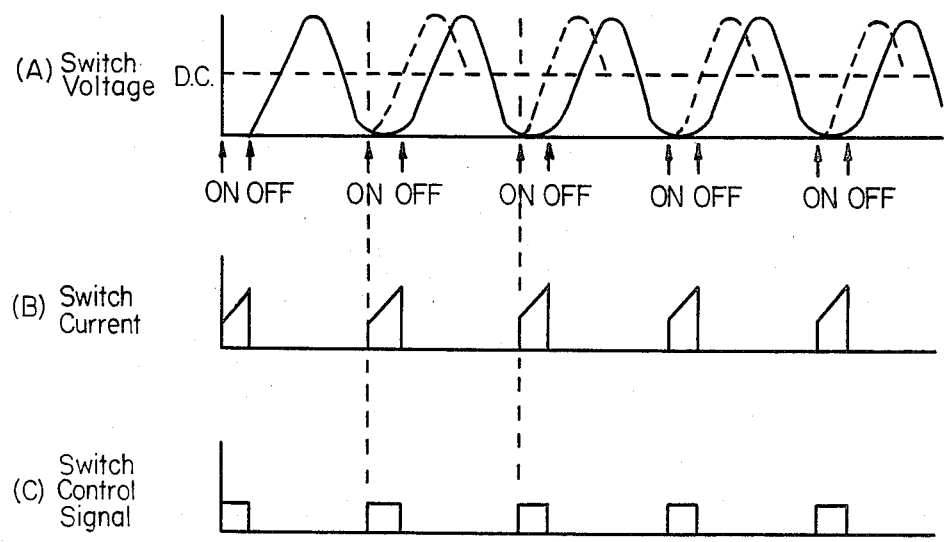
FIG. 4 is a series of graphs representing operation of the parallel resonant circuit static power switching system of FIG. 1 in accordance with the present invention under a light load in which (A) represents the voltage across the switch in the system of FIG. 1 when the LC resonant circuit is being driven by current pulses that begin at the point of minimum voltage across the switching element, (B) represents current flowing contemporaneously through the switch, and (C) represents switch control signal pulses produced by the switch control circuit.

Referring first to FIG. 1, there is a shown a functional block diagram of a static power switching system 10 in accordance with the present invention. The static power switching system is adapted to be operated from a source of unidirectional electrical power, such as, for example, d.c. power supply 12. It will, of course, be appreciated that the source of unidirectional electrical power may be drived from an alternating current power supply source and a rectifier, the output of the rectifier being either filtered or unfiltered and providing a potential that is unidirectional. Alternatively, the source of unidirectional electrical power may be a bank of batteries or photovoltaic cells.

The static power switching system 10 includes a parallel LC resonant circuit network 14 comprising a capacitor C and an inductor L. If static power switching system 10 is utilized in an induction heating apparatus, inductor L in network 14 would be an induction heating coil. Power take-off, or energy transfer, from network 14 is via inductor L, either by electrical connection of a load across the inductor or by mutual coupling to the inductor through the magnetic field thereof. In application of the static power switching system to an induction heating apparatus, power take-off would be through the magnetic field of the induction heating coil by mutual coupling of a conductive element thereto. In FIG. 1, load 16 receives power from static power switching system 10 by mutual coupling to inductor L.

A power switching element 18, to be referred to merely as a "switch", is interposed between power supply 12 and network 14. Switch 18 is selectively opened and closed, or "gated", by a control signal applied thereto. Gated closure of switch 18 causes unidirectional electrical power from power supply 12 to be supplied to network 14.

Referring briefly now to FIG. 2, prior to closure of switch 18, there is no current flow and the full supply voltage of power supply 12 appears across switch 18. However, when switch 18 is closed, voltage thereacross goes to zero and current flows therethrough to network 14. Since current through inductor L cannot change instantaneously, initial current flow is to capacitor C which charges to the supply voltage. A graph of current flow to capacitor C with respect to time is plotted in FIG. 2. Current flow through inductor L increases linearly with time, as is further shown in the graph of FIG. 2, until switch 18 is opened.

As is well known, when switch 18 is subsequently opened, the parallel LC resonant circuit network 14 will develop an oscillatory voltage across the capacitor and inductor components, which will exponentially decay to zero.

The graph of FIG. 3 represents the voltage across switch 18 immediately before, during and after closure. As indicated, therein, when switch 18 is open, or gated "off", it presents an open circuit across which is the voltage of power supply 12. When switch 18 is closed, or gated "on", a short circuit is created and the voltage across switch 18 drops to zero and remains so until switch 18 is again gated "off" at which point the voltage thereacross is oscillatory about the power supply 12 voltage. The maximum voltage amplitude across switch 18 after it is gated "off" is a function of the amount of time that the switch was "on" prior to being gated "off", and also a function of the load imposed upon the system.

Without further energization of network 14, the oscillatory voltage across network 14 decays to zero, and as shown in FIG. 3 the oscillatory voltage across switch 18 decays also, finally settling at the d.c. power supply voltage. This results because the voltage across switch 18 when it is "off" equals the d.c. power supply voltage minus the voltage across network 14. That is, after energization of network 14, the oscillatory voltage that is developed thereby is in opposition to the power supply voltage during the negative portion of its cycle and is additive with the power supply voltage during the positive portion of its cycle. Accordingly, the voltage across switch 18 is, after switch 18 is gated off, an oscillatory voltage swinging above and below the d.c. power supply voltage level.

In order to sustain continuous oscillation of network 14 and thereby produce a continuous power output to load 16, resonant network 14 must be periodically re-energized from d.c. power supply 12 by closure of switch 18. Accordingly, switch control circuit 20 is provided for generating a switch control signal that gates switch 18 "on" periodically.

In accordance with the present invention, switch control circuit 20 is operable in response to the voltage across switch 18. More specifically, switch control circuit 20 gates "on" switch 18 to energize network 14 when a minimum voltage appears across switch 18. To explain, reference will now be made to the waveforms shown in traces (A) through (C) of FIG. 4.

Illustrated in FIG. 4 are traces of switch voltage, switch current and the switch control signal applied to switch 18. The waveform traces represent operation of the static power switching system of FIG. 1 after start up and in steady state operation. As shown in FIG. 4, contemporaneous with the point of minimum (typically zero) voltage across switch 18, a switch control signal pulse is generated which gates "on" switch 18. At the point of minimum or zero voltage across switch 18, the voltage across network 14 is at a maximum; that is, capacitor C is charged to maximum potential. Accordingly, energizing current through switch 18 to network 14 goes into inductor L. Capacitor C takes none of the current. Thus, as shown in trace (B), switch current during the time of switch closure goes from zero current to an initial load current value and then builds in accordance with the characteristics of current flow to an inductor.

As will be observed from trace (A) in FIG. 4, when switch 18 is gated "on" by the switch control signal from switch control circuit 20, the partial cycle of oscillation is postponed. As further shown in trace (A) by the dashed lines, normal sinusoidal oscillatory variation of the voltage across switch 18 would begin an immediate rise after passing the point of minimum voltage.

Figure 5:
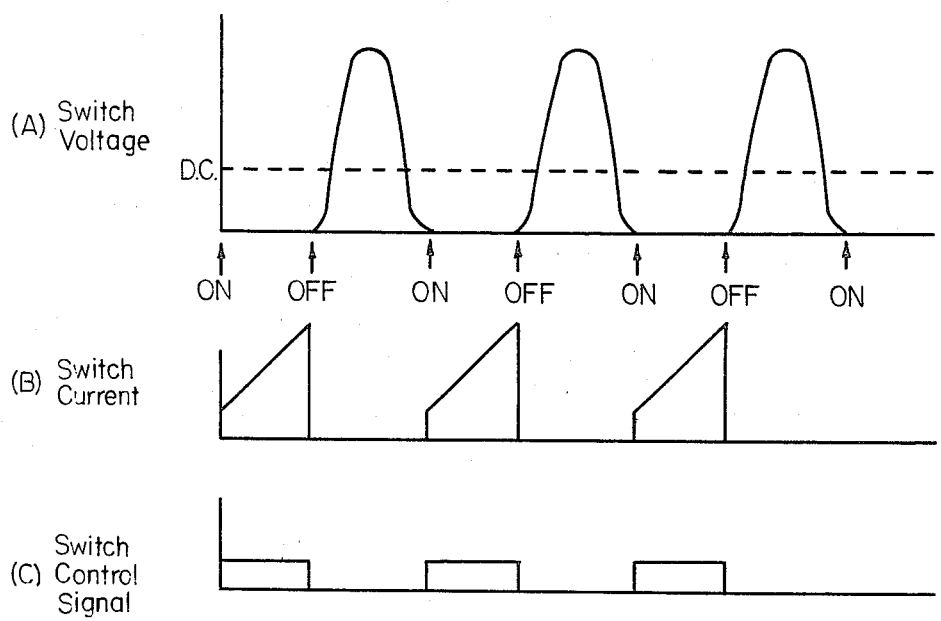
FIG. 5 is a series of graphs corresponding to the values represented in FIG. 4 when a greater load is being imposed upon the system of FIG. 1.

Referring now to FIG. 5, traces (A) through (C) represent the same signal waveforms: switch voltage, switch current and switch control signal, as are shown in FIG. 4. However, the signal waveforms shown in the traces of FIG. 5 are those which develop when a greater load is imposed upon the static power switching system of FIG. 1. With a higher load imposed on the system, more energy is being taken out of the magnetic field of the inductor L. Thus, a greater energizing current must be applied to network 14 to service the load requirements, which means that switch 18 must be closed for a longer period of time. If switch 18 is closed long enough to replace losses and the power transferred to the greater load, the switch current attains a higher level and oscillation of the voltage across the switch is further delayed. Since switch 18 is closed for longer periods of time with the greater load on the system, the maximum or peak voltage of the oscillation across switch 18 is higher than that developed with a lesser load.

Figure 6:
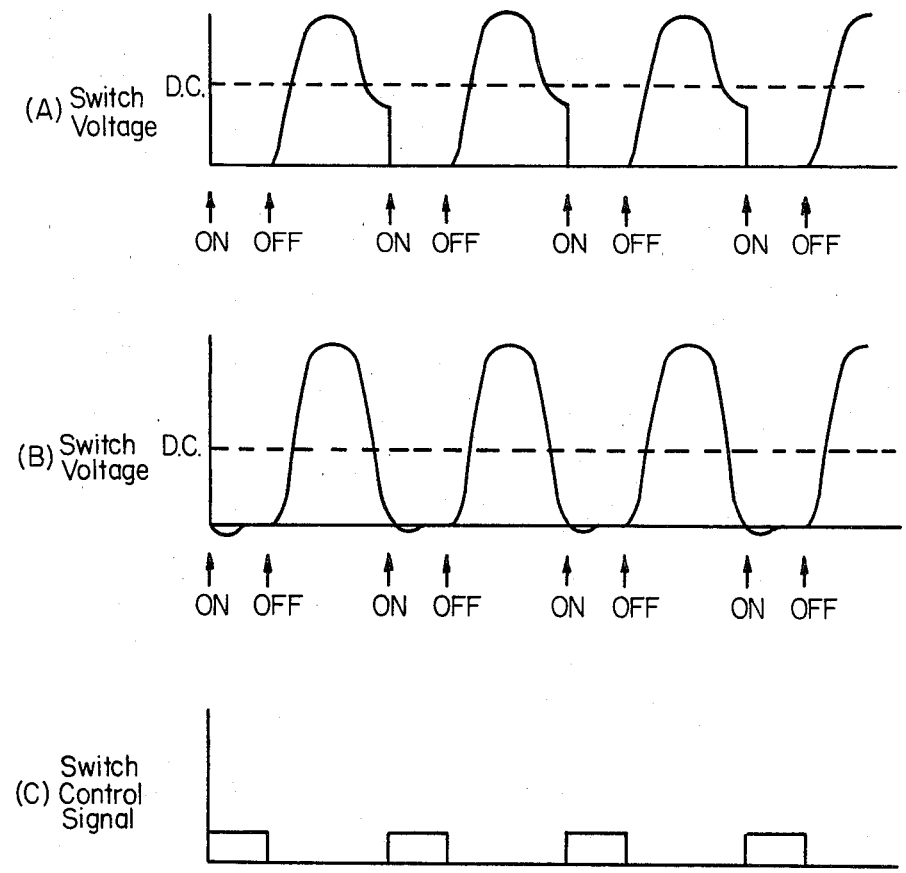
FIG. 6 is a series of graphs representing switch voltage for a given switch control signal pulse shown in (C), when the time of switch closure is insufficient for the load imposed, as shown in (A), and when the time of switch closure is excessive for the load imposed, as shown in (B)

Referring next to FIG. 6, the switch voltage traces (A) and (B) shown therein are representative of the switch voltage waveform which results for a given switch control signal (that is, a set amount of switch closure time) if network 14 is not being energized for a sufficient length of time for the load imposed (the (A) trace), and if network 14 is over energized (the (B) trace). If energizing current to network 14 is not applied long enough for the load, that is, switch 18 is not closed long enough to replace the transferred power and the losses, the point of minimum voltage across switch 18 will be at a higher voltage level, i.e., above zero volts, which means that capacitor C is not fully charged. Accordingly, upon switch closure at the point of minimum voltage across switch 18, there will be a surge of current to further charge capacitor C to the supply voltage.

If, however, switch 18 is closed too long, such that an excess of current is applied to inductor L, there will result a reversal of the voltage across switch 18 after closure. That is, switch voltage goes negative. Furthermore, unless switch 18 closure is delayed until the voltage approaches zero volts from the other side of the axis, a reverse flow of current from capacitor C will result.

In order to correct for the conditions of insufficient and excessive switch closure time and avoid operation of the system as shown in either trace (A) or trace (B) of FIG. 6, the duration of the switch control signal shown in trace (C) needs to be adjustable in response to the voltage across switch 18. In the case of insufficient energization, i.e., trace (A), the time of closure of switch 18 needs to be increased, whereas in the case of excessive energization, i.e., trace (B), the time of closure of switch 18 needs to be reduced.

Figure 7:
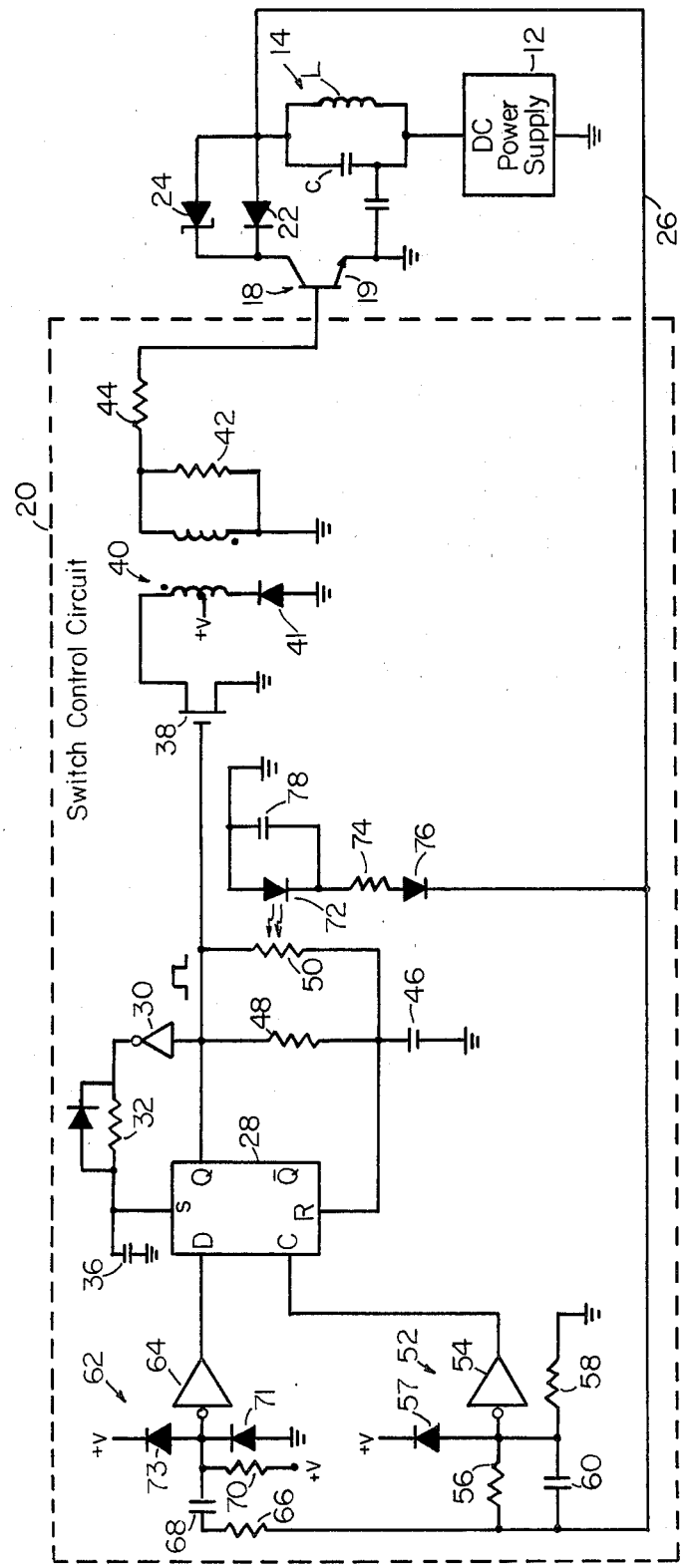
FIG. 7 is a schematic diagram of circuitry for implementing the block diagram of FIG. 1.

Referring now to FIG. 7, there is presented a schematic diagram of one suitable circuitry implementation of the block diagram of FIG. 1. In the circuitry of FIG. 7, a power transistor 19 is utilized as a switching element. Power transistor 19 is operated in normally cut-off mode. Parallel LC resonant circuit network 14 comprising capacitor C and inductor L is connected via diode 22 to the collector of power transistor 19. The opposite side of network 14 is, of course, connected to d.c. power supply 12. A zener diode 24 is connected across diode 22 for over voltage protection of diode 22. Power transistor 19 and diode 22 together correspond to switch 18 in FIG. 1 and will be referred to collectively as switch circuit 18.

Turn-on drive and turn-off drive for power transistor 19 is provided by switch control circuit 20. Since turn-on drive to power transistor 19 is to be in response to the voltage across switch circuit 18, a monitor line 26 is connected to the anode of diode 22 and routed back to switch control circuit 20.

Upon initial start-up of static power switching system 10, turn-on drive to power transistor 19 is initiated by flip-flop 28 and the circuitry connected between its Q output and Set input. Upon initial start up of the system, the Q output of flip-flop 28 is "low", and inverter 30 generates a logic "one" that is applied via resistor 32 to capacitor 36 and the Set input(s) of flip-flop 28. Capacitor introduces a delay in the application of the logic "one" from the Q output to the Set input. Upon application of a logic "one" to the Set input of flip-flop 28, the Q output goes "high". Inverter 30 then removes the logic "one" signal from the Set input with diode 34 across resistor 32 providing rapid discharge of capacitor 36.

A "high" condition on the Q output of the flip-flop 28 places field effect transistor 38 in a conducting state such that current flows through the primary winding of a "flyback" transformer 40. Current flow through the primary of transformer 40 induces a voltage across the secondary winding of transformer 40 and across resistor 42 which damages leakage reactance oscillation at cut-off of transistor 19. The induced voltage results in a flow of current through series drive transistor 44 to power transistor 19, resulting in transistor 19 being turned on. Current flow through transistor 19, of course, energizes network 14 and causes a build up of voltage thereacross.

Also, when the Q output of flip-flop 28 goes "high", capacitor 46 begins to charge through the equivalent resistance value of parallel resistors 48 and 50. After some elapsed time duration following assumption by the Q output of the "high" state, the voltage on capacitor 46 reaches a sufficient level to cause resetting of flip-flop 28 by reason of the electrical connection between capacitor 46 and the Reset input of flip-flop 28. With the resetting of flip-flop 28, base drive to power transistor 19 is terminated and switch circuit 18 is opened. At that point, parallel LC resonant circuit network 14 begins to oscillate, producing an oscillatory voltage across switch circuit 18. Also, power is transferred to any load coupled to the inductor L.

The voltage across switch circuit 18 is routed over monitor line 26 to means 52 for detecting the point of minimum voltage. In proper operation, as shown in FIGS. 4 and 5, the point of minimum switch voltage is zero volts. Means 52 in the embodiment shown in FIG. 7 includes an inverter 54, the output of which is applied to the clock input of flip-flop 28. The input of inverter 54 is connected to monitor line 26 through a voltage divider network comprising resistor 56 and resistor 58. For the particular power supply potential of 80 volts for power supply 12, the resistance value of resistor 56 is chosen to be twice that of resistor 58 such that one-third of the voltage upon monitor line 26 is applied to inverter 54.

As the oscillatory voltage across switch circuit 18 starts down, the voltage applied to inverter 54 also begins decreasing. Inverter 54 is suitably implemented using an RCA CD4007A, but a Motorola MC 14584 integrated circuit is preferred. An inverter of that type changes the logic state at its output from a "low" to a "high" when the voltage on the input has decreased to about three to four volts. Since the voltage divider comprising resistors 56 and 58 has a one-third voltage divider ratio, inverter 54 will change states and produce a clock pulse to flip-flop 28 when the voltage on monitor line 26 has fallen to approximately 10 volts. However, because of the inherent time delay in inverter 54, flip-flop 28 and the circuitry between the Q output of flip-flop 28 and the base of power transistor 19, turn-on drive to the base of power transistor 19 will actually be applied at substantially the point in time when the voltage across switch circuit 18 reaches a minimum, typically zero volts. Detection means 52 may further include a capacitor 60 for balancing the phase relationship between the voltage across switch circuit 18 and the voltage applied to the input of inverter 54, and also include a protection diode 57.

Monitor line 26 is also connected to circuitry 62 which provides a data input to the D input of flip-flop 28. Circuitry 62 includes an inverter 64 and a series RC network comprising resistor 66 and capacitor 68. The input of inverter 64 is tied "high" through resistor 70 and has protection diodes 69 and 71 connected thereto.

Circuit 62 is provided to establish a "high" input to flip-flop 28 indicating that the voltage across switch circuit 18 has gone up to a maximum and reversed. The series RC network is a differentiator; thus, the input signal to inverter 64 is the differential of the voltage across switch circuit 18. The input to inverter 64 is normally kept "high"; however, when voltage oscillation on monitor line 26 is negative going (a negative rate of voltage change), the input of inverter 64 is taken "low" which produces a "high" logic state on the D input of flip-flop 28.

Flip-flop 28 may suitably be a Motorola MC 14013 integrated circuit device. The circuitry for setting, resetting, supplying data, and clocking the flip-flop device are designed for the operational characteristics of that particular flip-flop. If another type of bistable device is utilized, it may be necessary to modify the circuitry peripheral thereto. However, functional equivalency should be maintained.

Voltage monitor line 26 is also connected to circuitry which includes light emitting diode 72. Light emitting diode 72 is part of an optical coupler that further includes resistor 50. Connected in series with light emitting diode 72 is a current limiting resistor 74 and a diode 76. A negative voltage on monitor line 26 forward biases light emitting diode 72 and charges capacitor 78 connected in parallel therewith. Capacitor 78 in effect acts as an integrator to develop and hold an average voltage across light emitting diode 72. Depending upon the voltage level developed across capacitor 78, light emitting diode 72 causes resistor 50 to assume a particular resistance value.

The voltage on monitor line 26 goes slightly negative on each cycle when the circuit of FIG. 7 is operating properly, and as it varies in average amplitude over several cycles, it will effect a variation in the resistance of resistor 50. Variations in the resistance of resistor 50 will change the time constant for charging capacitor 46; and thus alter the time of resetting of flip-flop 28 after the Q output thereof goes "high". Accordingly, the pulse width of the signal that is ultimately applied as the base turn-on drive to power transistor 19 is adjustable in accordance with the voltage across switch circuit 18. By means of this pulse duration adjustment, the conditions illustrated by traces (A) and (B) of FIG. 6 can be corrected.

The following table gives values for the components used in the circuitry of FIG. 7. Such values and part identifications are, however, only illustrative.

TABLE I

| | |
|---|---|
| Power transistor 19 | Motorola 2N6547 |
| Field Effect Transistor 38 | Siliconix VN46AF |
| Diode 22 | MBR1540 |
| Diode 34, 57, 69, 71 | 1N4148 |
| Diode 74 | 1N4937 |
| Zener Diode 24 | 1N5240B |
| Capacitor C | .75 Microfarad (for unloaded 20KHZ operation) |
| Inductor L | 90 Microhenries |
| Inverters 30, 54, 64 | Motorola MC 14584 |
| Flip-flop 28 | Motorola MC 14013B |
| Resistor 32 | 100,000 ohms |
| Resistor 48 | 500,000 ohms |
| Resistor 42 | 100 ohms |
| Resistor 44 | 2 ohms |
| Resistor 74 | 22 ohms |
| Resistor 56 | 2 Megaohm |
| Resistor 58 | 1 Megaohm |
| Resistor 66 | 220,000 ohms |
| Resistor 70 | 100,000 ohms |
| Capacitor 46, 68 | 220 picofarad |
| Capacitor 60 | 1-3 picofarad |
| Capacitor 36 | 1000 picofarad |
| Capacitor 78 | 470 microfarad |
| Transformer 40 | Core: Ferroxcube 1811PL00-3B7 Np: 2 × 60 turns, #30 enamel wire Ns: 15 turns, #24 enamel wire |
| Optical coupler | General Electric H11F3 |
| Power Supply | 80 volts dc |
| +V | 15 volts dc |

The foregoing description of the invention has been directed to a particular preferred embodiment for purposes of explanation and illustration. It will be apparent, however, to those skilled in the art of static power switching systems that many modifications and changes in the illustrated circuitry may be made without departing from the essence of the invention. For example, various circuit arrangments can be designed for the switch control circuit. Also, several types of power switching elements other than a power transistor can be utilized. Moreover, although a single switch system is disclosed, the present invention may also be embodied in a push-pull or bridge switching arrangement, particularly in high power applications where a single switch cannot handle the required power. It is the intention in the following claims to cover equivalent forms of implementing a static power switching system in which drive to a parallel LC resonant circuit is repetitiously provided through a switching circuit, which drive begins at the point of minimum voltage across the switching circuit.

What is claimed is:

1. A static power switching system comprising:
    a unidirectional source of electrical power;
    a parallel LC network;
    a switching element coupled to the LC network for applying electrical energy from the power source to the network in response to a switch control signal, thereby producing voltage swings across the switching element; and
    a switch control circuit for repeatedly producing a switch control signal beginning at the minimum point of each voltage swing across the switching element.

2. The static power switching system of claim 1 wherein the switching element is a power transistor.

3. The static power switching system of claim 1 wherein the switch control circuit comprises:
    means for detecting the point of minimum voltage across the switching element; and means for producing a switch control signal pulse in response to the detection of the point of minimum voltage.

4. The static power switching system of claim 3 wherein the switch control circuit further comprises:
   means for establishing the duration of the switch control signal pulse.

5. An induction heating apparatus, which comprises:
   a source of unidirectional electrical power;
   a parallel LC network including an induction heating coil;
   a switch circuit including a power switching transistor coupled between the power source and the LC network for applying electrical energy from the power source to the network upon closure to produce current flow in the induction heating coil that generates a magnetic field and creates an oscillatory voltage across the transistor; and
   a control circuit for applying base drive to the power transistor beginning at the point of minimum voltage across the switch circuit to put energy into the induction heating coil.

6. The induction heating apparatus of claim 5 wherein the control circuit comprises:
   means for detecting the point of minimum voltage across the switch circuit; and
   means for producing a transistor base drive signal pulse in response to the detection of minimum voltage across the switch circuit.

7. An induction heating apparatus, which comprises:
   a source of unidirectional electrical power;
   a parallel LC network including an induction heating coil;
   a switch circuit coupled between the power source and the LC network for applying electrical energy from the power source to the network upon closure to produce current flow in the induction heating coil that generates a magnetic field and creates an oscillatory voltage across the switch circuit;
   first means for detecting the falling portion of each cycle of the oscillatory voltage across the switch circuit;
   second means for detecting the point of minimum voltage across the switch circuit;
   third means connected to the first detection means and the second detection means for producing a switch circuit control signal pulse; and
   fourth means for monitoring the amplitude level of the oscillatory voltage across the switch circuit to establish the duration of the switch circuit control signal pulse produced by said third means.

8. A static power switching system which comprises:
   a source of unidirectional electrical power;
   a power switching element coupled to the power source and adapted to be gated by a control signal pulse for supplying unidirectional electrical power from the power source;
   a parallel LC network including an induction coil coupled to the power switching element for receiving unidirectional electrical power supplied from the switch and developing an oscillatory voltage thereacross, the network being adapted for power take-off through the magnetic field of the induction coil; and
   a switch control circuit for generating control signal pulses to repetitiously gate the power switching element and provide current drive therethrough to the parallel LC network putting energy into the induction coil, the switch control circuit generating a control signal pulse beginning at the minimum point of the oscillatory voltage developed across the switching element.

9. An induction heating apparatus, which comprises:
   a source of unidirectional electrical power;
   a parallel LC network including an induction heating coil;
   a switch circuit including a power switching transistor coupled between the power source and the LC network for applying electrical energy from the power source to the network upon closure to produce current flow in the induction heating coil that generates a magnetic field and creates an oscillatory voltage across the transistor;
   first means for detecting the negative-going portion of each cycle of the oscillatory voltage across the switch circuit;
   second means for detecting the point of minimum voltage across the switch circuit;
   a flip-flop device having a data input connected to the first detection means and a clock input connected to the second detection means for producing a transistor base drive signal pulse; and
   means for monitoring the amplitude level of the oscillatory voltage across the switch circuit to establish the duration of the transistor base drive signal pulse produced by the flip-flop device.

* * * * *